US008417016B2

(12) United States Patent
Bell et al.

(10) Patent No.: US 8,417,016 B2
(45) Date of Patent: Apr. 9, 2013

(54) ACCEPTOR DEVICE FOR SHEET OBJECTS

(75) Inventors: Malcolm Reginald Hallas Bell, Leeds (GB); Kevin Charles Mulvey, Warrington (GB); Andrew William Barson, Stockport (GB); John Ashby, Lancashire (GB)

(73) Assignee: Money Controls Limited, Royton Oldham (GB)

( * ) Notice: Subject to any disclaimer, the term of this patent is extended or adjusted under 35 U.S.C. 154(b) by 0 days.

(21) Appl. No.: 11/721,961

(22) PCT Filed: Dec. 13, 2005

(86) PCT No.: PCT/EP2005/056757

§ 371 (c)(1), (2), (4) Date: Jun. 15, 2007

(87) PCT Pub. No.: WO2006/064008

PCT Pub. Date: Jun. 22, 2006

(65) Prior Publication Data

US 2008/0273789 A1 Nov. 6, 2008

(51) Int. Cl.
*G06K 9/00* (2006.01)

(52) U.S. Cl.
USPC ........... 382/135; 382/137; 382/193; 382/199; 382/278; 382/282; 382/283; 382/286; 382/287; 382/288; 382/289; 382/293; 382/294; 382/295; 382/296; 382/297; 356/71; 194/206; 209/534

(58) Field of Classification Search .................. 382/135, 382/137, 193, 199, 278, 282, 283, 286–289, 382/293–297; 356/71; 194/201, 206; 209/534
See application file for complete search history.

(56) References Cited

U.S. PATENT DOCUMENTS 4,179,685 A * 12/1979 O'Maley ........................ 382/135
4,202,627 A * 5/1980 Suzki et al. ...................... 356/71
4,623,975 A 11/1986 Kagami (Continued)

FOREIGN PATENT DOCUMENTS

| | | | |
|---|---|---|---|
| EP | 0 802 510 | A3 | 2/1999 |
| GB | 2 221 030 | A | 1/1990 |
| GB | 2 372 808 | A | 9/2002 |

OTHER PUBLICATIONS

PCT/EP2005/056757 Search Report, Mar. 15, 2006.
GB 0427484.1 Search Report, Feb. 18, 2005.

(Continued)

*Primary Examiner* — Matthew Bella
*Assistant Examiner* — Julian Brooks
(74) *Attorney, Agent, or Firm* — Orrick Herrington & Sutcliffe, LLP

(57) ABSTRACT

An acceptor device for sheet objects such as banknotes, comprises a sensor to derive data corresponding to a spatial array of data samples from a face of a sheet object, said data being configured in a sampling frame that lies within a range of positional relationships to a reference frame. The acceptor device also comprises a processor operable to process the data to determine the relationship between the reference frame and the sampling frame for the sensed data, and being operable to transform pre-selected regions of the sensed data from the sampling frame so as to correspond to data in the reference frame, and to make a comparison of the transformed data with reference data corresponding to the pre-selected regions in the reference frame and to the sheet object depending on the outcome of the comparison.

24 Claims, 13 Drawing Sheets

U.S. PATENT DOCUMENTS

| | | | | |
|---|---|---|---|---|
| 5,363,949 | A | 11/1994 | Matsubayashi | |
| 5,680,472 | A | 10/1997 | Conant | |
| 5,943,655 | A * | 8/1999 | Jacobson | 705/30 |
| 6,128,401 | A | 10/2000 | Suzuki et al. | |
| 6,234,294 | B1 | 5/2001 | Defco et al. | |
| 6,354,507 | B1 | 3/2002 | Maeda et al. | |
| 6,373,973 | B2 * | 4/2002 | Neri et al. | 382/135 |
| 7,149,349 | B2 * | 12/2006 | Druitt et al. | 382/165 |
| 2003/0030785 | A1 | 2/2003 | Christophersen | |
| 2003/0118228 | A1 * | 6/2003 | Mennie et al. | 382/135 |
| 2003/0165258 | A1 * | 9/2003 | Kubota et al. | 382/113 |
| 2004/0240722 | A1 * | 12/2004 | Tsuji et al. | 382/137 |

OTHER PUBLICATIONS

Written Opinion of the International Searching Authority for PCT/EP2005/056757.

* cited by examiner

ACCEPTOR DEVICE FOR SHEET OBJECTS

RELATED APPLICATIONS

Applicants hereby claim priority under 35 USC §371 and §119 for International Application No. PCT/EP2005/056757 filed Dec. 13, 2005, entitled "ACCEPTOR DEVICE FOR SHEET OBJECTS" and British Application Number GB 0427484.1 filed Dec. 15, 2004, entitled, "ACCEPTOR DEVICE FOR SHEET OBJECTS" incorporated herein by reference.

FIELD OF THE INVENTION

This invention relates to an acceptor device for sheet objects such as banknotes.

BACKGROUND

Banknote acceptors are well known for use in vending and gambling machines. In a typical banknote acceptor, the banknote is inserted through an inlet slot and is driven along a path past a transversely extending array of sensors that sense characteristics of one or more faces of the banknote. It is known to use optical sensors arranged in an array to detect successive rows of data samples from the face of the banknote as it passes the array. The sensing arrangement may operate in a transmissive mode in which an optical light source is disposed to transmit light through the banknote to the sensors of the array. Alternatively, light from the source may be reflected from the face of the banknote to the optical sensors.

The data derived from the sensors may be digitised and compared with reference data corresponding to acceptable banknotes. The detection may be carried out in more than one wavelength band.

In order to allow the data from the sensor array to be compared with the reference data, the banknote needs to pass the detector array along a pre-set path. In the past, a guide rail has been provided extending along the path, so that a side edge of each successive banknote under test moves along the path whilst abutting the guide rail. In this way, consistent data can be derived from banknote to banknote, that can be compared with the reference data for acceptable banknotes stored in the memory. In order to compare banknotes of different sizes, proposals have been made in the past to use a stepped entrance path with steps of different widths to align different width banknotes with the path through the detector array. However, this does not work well with crinkled or damaged banknotes. Also, mechanically driven guide plates have been proposed, that move transversely of the path in order to urge the banknotes of different widths against the guide rail or centrally of the path. These mechanical arrangements for aligning the banknote are mechanically complicated and so add significantly to the cost of the banknote acceptor. Also, they can be unreliable and not accurately guide the banknote along the desired path.

Proposals have been made to scan a banknote and to transform all the scanned data for counting purposes, as described in U.S. Pat. No. 5,680,472 but the process involves large amounts of data and is computationally slow.

The present invention seeks to overcome these problems and disadvantages.

SUMMARY OF THE INVENTION

According to the invention there is provided an acceptor device for sheet objects, comprising a sensor to derive data corresponding to a spatial array of data samples from a face of a sheet object, said data being configured in a sampling frame that lies within a range of positional relationships with a reference frame; and processing means operable to process the data to determine the relationship between the reference frame and the sampling frame for the sensed data, and being operable to transform pre-selected regions of the sensed data from the sampling frame so as to correspond to data in the reference frame, and to make a comparison of the transformed data with reference data corresponding to the pre-selected regions in the reference frame that define acceptability criteria for sheet objects in said reference frame, and acceptor means for accepting the sheet object depending on the outcome of the comparison.

The acceptor device according to the invention has the advantage that the sheet object such as a banknote need not be oriented along a guide rail when sensed by the sensor. As a result, the banknote can enter the acceptor device in a range of positional relationships and can be of different sizes.

The invention also includes a device for selectively programming the acceptor, comprising a processor and a display device, configured to receive said a spatial array of data samples from a face of a reference sheet object of a known denomination, and to provide a visual display thereof, a user interface to allow a user to define on the display at least one selected location in said array of data samples, the processor being operable to provide a data set comprising data corresponding to said selected locations together with data corresponding to the samples form said location and data corresponding to the denomination of the sheet object, for storage in the acceptor.

BRIEF DESCRIPTION OF THE DRAWINGS

In order that the invention may be more fully understood an embodiment thereof will now be described by way of example with reference to the accompanying drawings in which.

DETAILED DESCRIPTION

Figure 1:
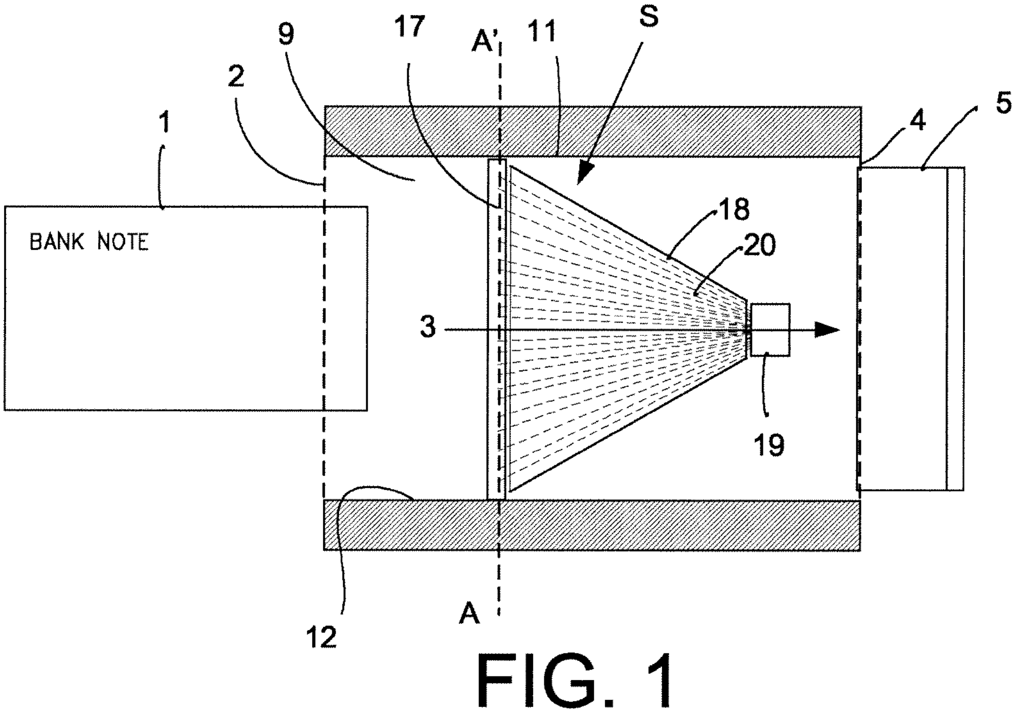
FIG. 1 is a schematic plan view of an acceptor device according to the invention.

The example of the invention illustrated in the drawings is for accepting banknotes and as used herein the term “banknote” means a promissory note especially from a central bank or other governmental organisation payable to the bearer on demand for use as money, also known as “paper money” and in the USA as “currency” or a “bill”.

Figure 2:
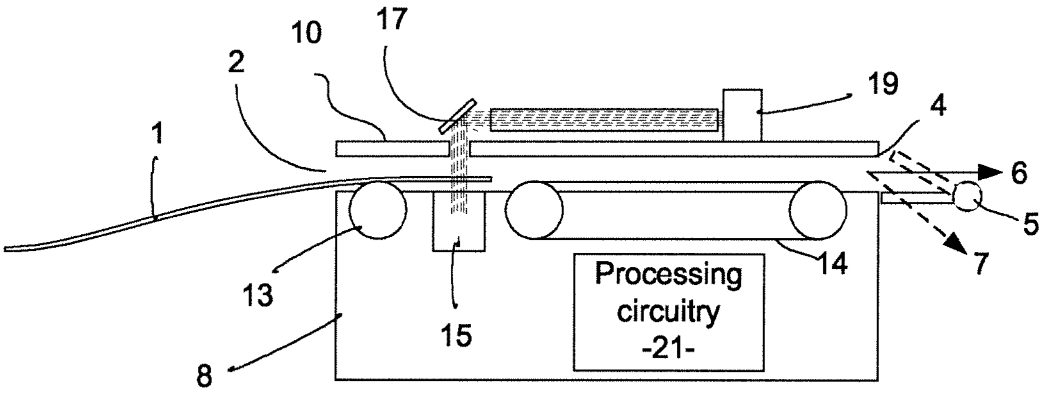
FIG. 2 is a schematic sectional view of the device shown in FIG. 1.

Referring to FIGS. 1 and 2, a banknote acceptor according to the invention receives a banknote 1 through an inlet 2 wider than the banknote, such that the banknote passes along a path 3 shown in dotted outline to an outlet 4 through a sensing station S.

A solenoid operated gate 5 is disposed at the outlet 4 to direct acceptable banknotes along an acceptance path shown by arrow 6, or to rotate to a position shown in dotted outline to direct unacceptable banknotes along reject path 7 shown in dotted outline. Alternatively, an unacceptable banknote can be rejected by reversing it back through the inlet 2, as described in more detail below.

As shown in FIG. 2, the path 3 for the banknote is defined between a main body 8 with a platen 9 overlaid by a spaced panel 10. As shown in FIG. 1, the platen 9 is formed with upstanding regions 11, 12 that define side edges of the path 3. The banknote 1 is driven along the path 3 by means of a roller 13 and a belt and pulley arrangement 14 driven by electric motors (not shown). The banknote does not need to be guided by the edge regions 11, 12 as will be evident hereinafter.

The sensor station S comprises an optical source 15 for emitting optical radiation, which extends across the entire width of the path 3, mounted in the main body 8 on the underside of the path 3. One example of the source 15 is an array of surface mounted LEDs arranged in closely packed rows to emit different coloured optical radiation, covered by a diffusing sheet to provide spatially uniform illumination over a broad optical band. Alternatively, a light emitting polymer sheet or other light sources can be used. A light guide arrangement 16 comprising a mirror 17 and a fan shaped lens 18 directs light that passes through the banknote to a solid-state photosensor array 19, which in this example comprises a CMOS chip. The individual pixels of the array are closely spaced on the chip 19 and the fan shaped lens 18 ensures that each pixel is responsive to respective spaced apart sampling locations disposed along the line A-A', across path 3, as illustrated by dotted lines 20 in FIG. 1.

Processing circuitry 21 for controlling operation of the device may be mounted in the main body 8. The processing circuitry 21 is shown in block diagrammatic form in FIG. 3 and comprises a micro controller 22 that receives digital samples from the pixelated photosensors in chip 19. The data samples are compared with corresponding samples for acceptable banknotes stored in memory 23. The gate 5 is driven by driver circuit 24 so that acceptable banknotes are allowed to pass along path 6 and non-acceptable banknotes are passed along path 7 as illustrated in FIG. 2

The micro controller 22 also controls operation of a driver circuit 25 to operate the light source 15. The micro controller 22 further controls a driver circuit 26 which operates the roller 13 and pulley arrangement 14, to drive the banknote 1 along the path 3 shown in FIGS. 1 and 2. The driver 26 may be operated under the control of the micro controller 22 in response to a sensor, not shown, that detects the insertion of a banknote into the inlet 2. Also, instead of rejecting banknotes on the reject path 7, non-acceptable banknotes can be rejected by the microcontroller 22 instructing the driver 26 to reverse the drive direction of the roller 13 and the pulley arrangement 14, so that the unacceptable banknote is reversed back out of the inlet 2.

Figure 4:
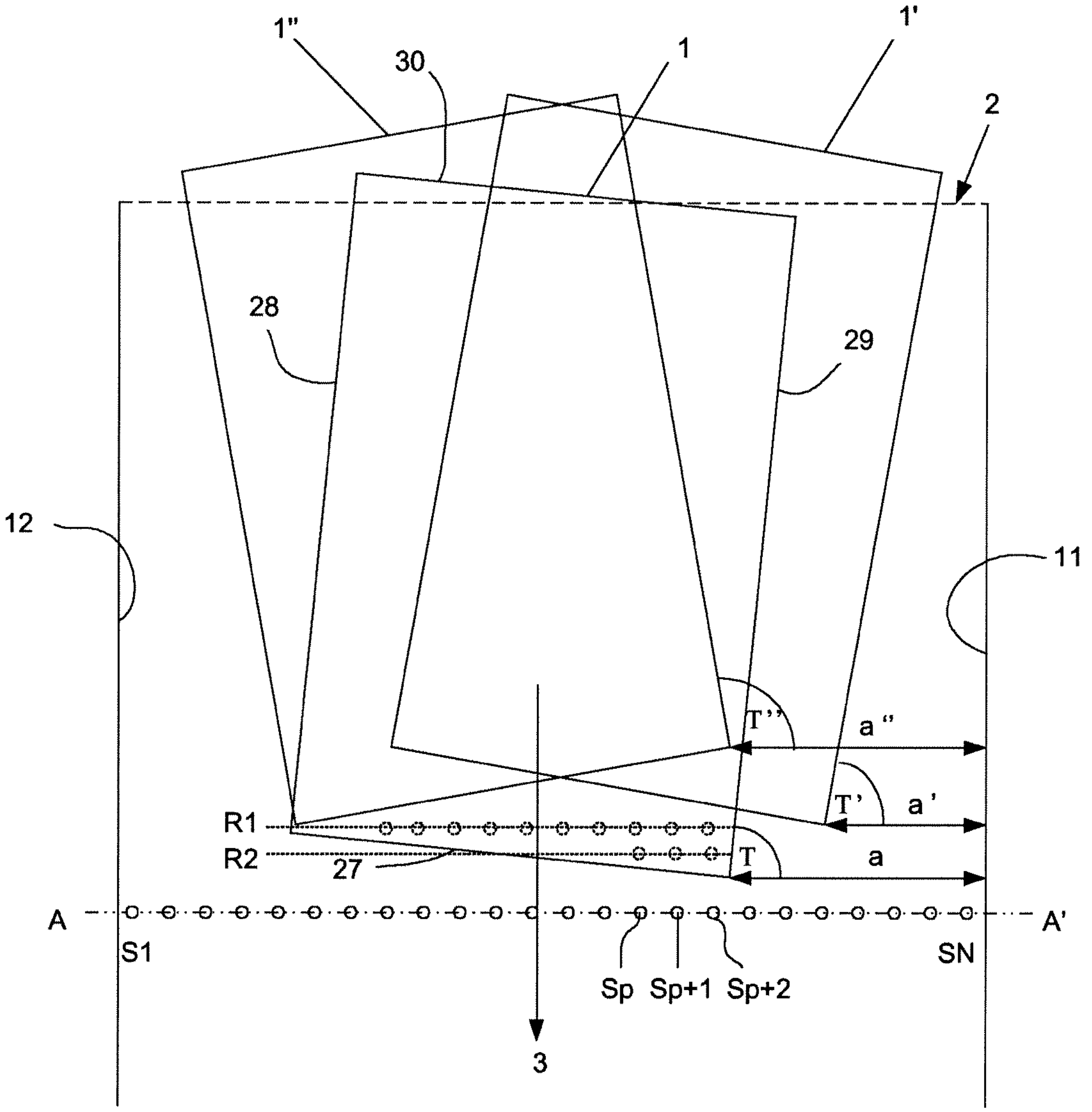
FIG. 4 illustrates schematically the passage of a banknote through the sensing station without abutting a guide rail and in a range of difference angular and positional relationships.

Referring to FIG. 4, the pixelated data samples derived by the array of sensor 19 are derived at sampling locations S1-SN along the line A-A' disposed at right angles to the direction of path 3. As illustrated in FIG. 4, the banknote 1, which is narrower than the width of the path 3 can traverse the sampling regions S1-SN in a range of angles and spacings compared with the side edges 11, 12 of the path 3. The banknote 1 has a leading edge 27 spaced at a distance a from side edge 11 of track 3 and is disposed at an angle θ to the line A-A'. However, the banknote may enter the device through inlet 2 in a range of angles and positions. Two other possible configurations for the banknote 1 are illustrated by way of example in dotted outline as banknote 1' and banknote 1". The banknote 1' is disposed at a spacing a' from side edge 11, at an angle θ'. Similarly, the banknote 1" is spaced at a distance a" from the side edge 11, at angle θ". Thus, as the banknote traverses the line A-A', data samples are developed at different ones of the sampling regions S1-SN depending on the angle θ and the spacing a of the banknote under test.

Thus, not all of the sensors of the array will detect data from the banknote 1, depending on the configuration of its side edges 28, 29 and is trailing edge 30.

Figure 3:
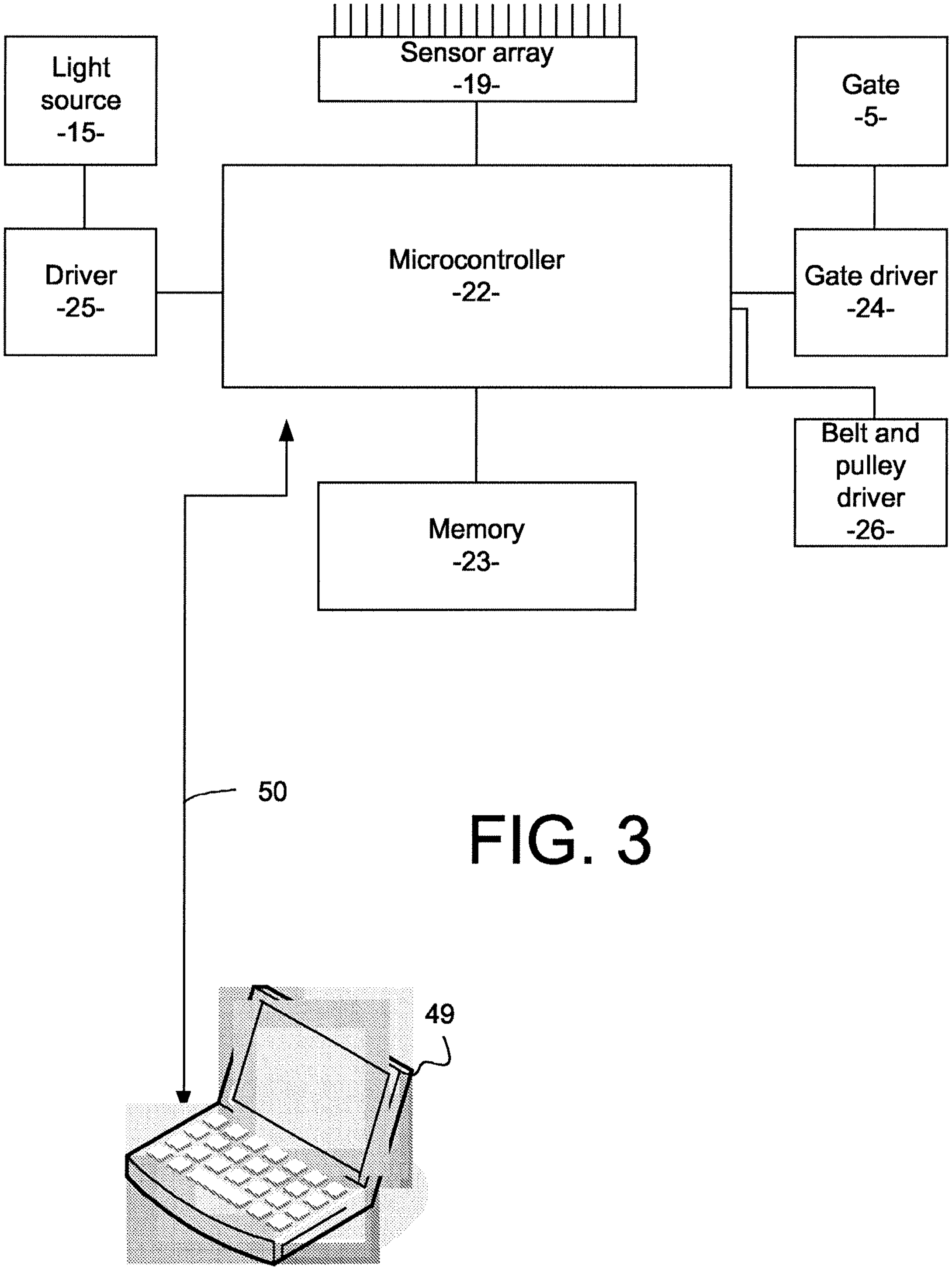
FIG. 3 is a schematic block diagram of the device shown in FIGS. 1 and 2.

As the banknote traverses the sampling regions S1-SN, successive rows of samples of data are developed, which are digitised in sensor array 19 and fed to the micro controller 22 shown in FIG. 3. Thus, for the banknote 1, a first row R1 of samples is derived, followed by a second row R2 etc until the entire banknote passes the line A-A', thereby producing a spatial array of data samples for the banknote.

Since the banknote 1 approaches the sensor array A-A1' at an angle θ, the first row R1 of data samples comprises an incomplete line of data samples; only samples from sampling positions Sp, Sp+1, Sp+2 are developed in this example. Similarly, for row R2, an incomplete row is produced. This is illustrated in more detail in FIG. 5, in which the footprint of the banknote 1 is shown in dotted outline and the corresponding pixelated sample array 31 is also illustrated. It will thus be seen that the data samples of the two dimensional sample array 31 are taken in a banknote sample frame F1 which can vary from banknote to banknote depending on the angle θ and the spacing a for the banknote as it approaches the array of sampling positions S1-SN shown in FIG. 4. However, the data for acceptable banknotes held in memory 23 is held in a reference frame F2, which is related to the frame F1 by a vector $\bar{r}$ and the angle θ at which the banknote approaches the sensor array and also its position in the track 3 between the side walls 11, 12.

Figure 6:
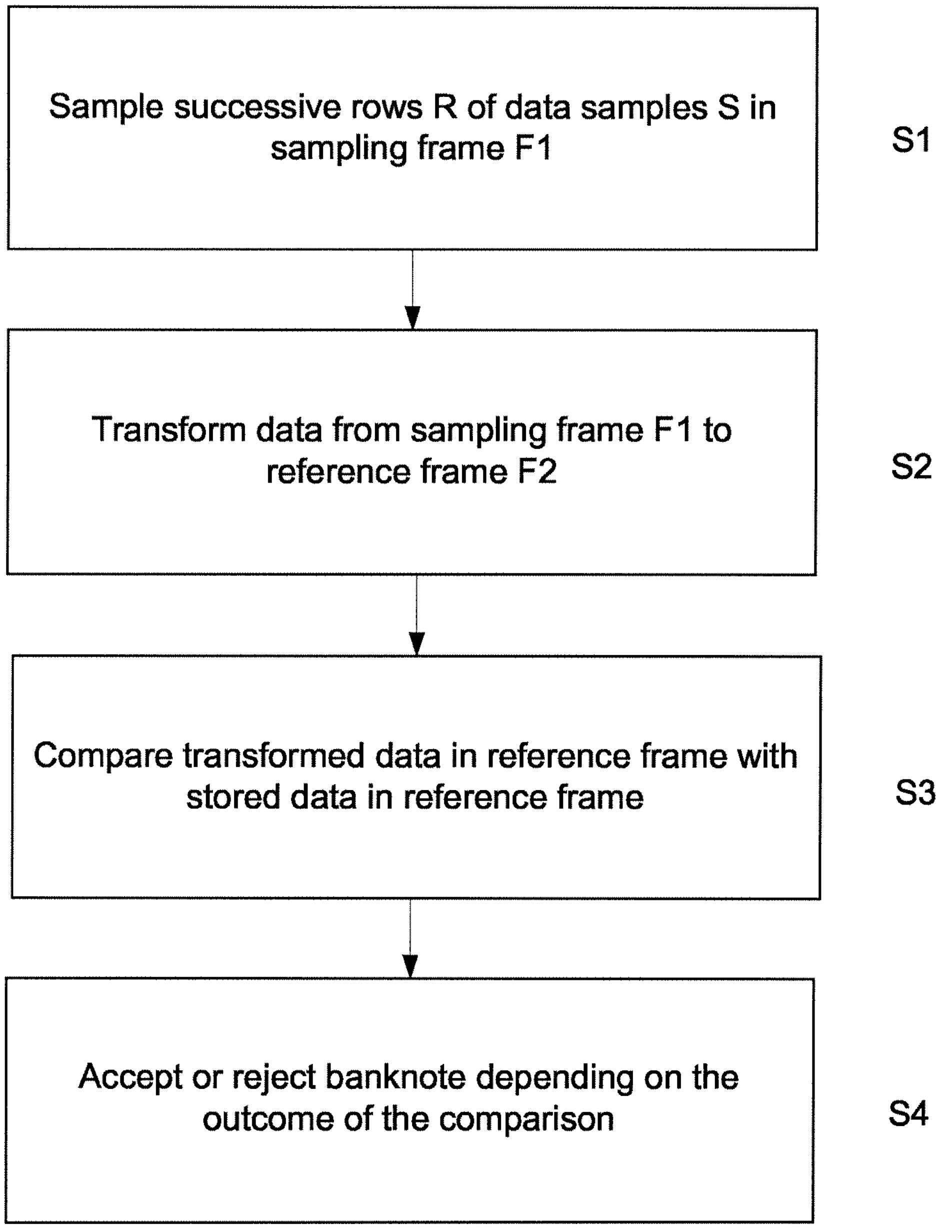
FIG. 6 is a flow chart of the process of accepting a sheet object.

The general process performed by the microprocessor to accept or reject the banknotes is illustrated in the flow chart of FIG. 6. In step S1, the successive rows R of pixelated data are captured in the banknote sample frame F1 as previously described and are stored in the operating memory of the micro controller 22.

Then, data from the banknote sample frame F1 is transformed or skewed into the reference frame F2, in step S2. In step S3, the resulting transformed or de-skewed data is compared with reference data stored in memory 23 by the micro controller 22, the reference data corresponding to acceptable banknotes. At step S4, the banknote under test is either accepted or rejected under the control of micro controller 22, which operates gate driver 24 either to direct the banknote along accept path 6 or reject path 7, by operating gate 5. Alternatively, the direction of drive of roller 13 can be controlled to drive an acceptable banknote forward, or to reverse a rejected banknote back through the inlet 2.

Figure 5:
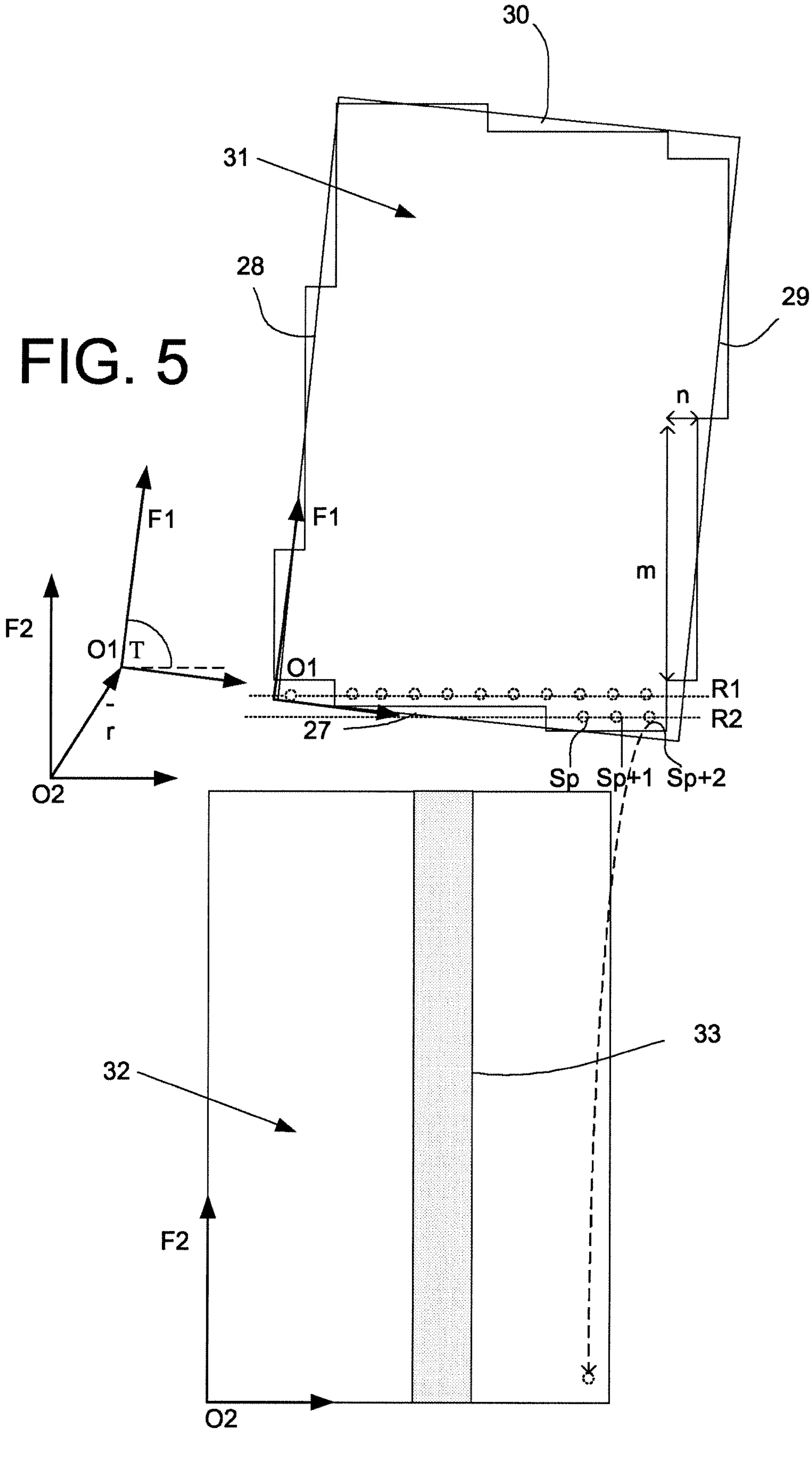
FIG. 5 illustrates the sampling frame, reference frame and the array of data in said frames.
Figure 7:
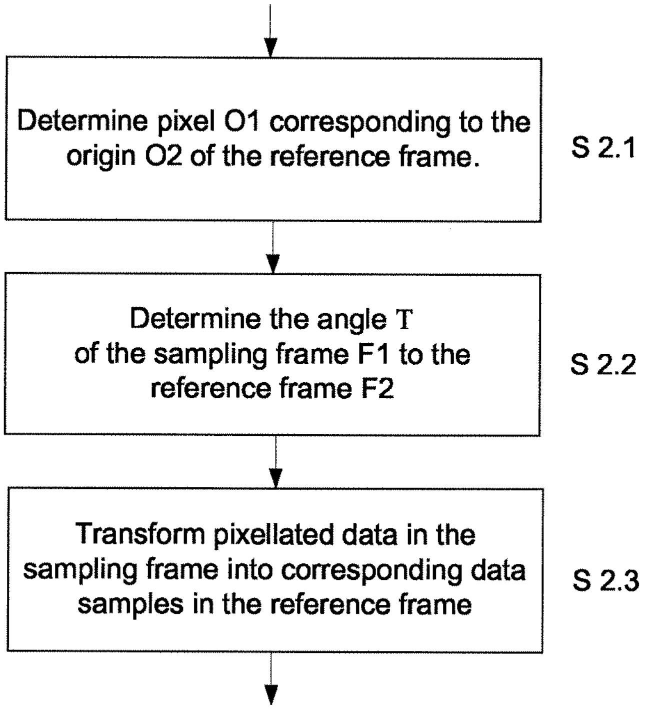
FIG. 7 illustrates the step S2 of FIG. 6 in more detail.

The data transformation step S2 will now be described in more detail. Referring again to FIG. 5, the two dimensional pixelated array 31 of sample data in banknote sampling frame F1 is to be transformed into a corresponding array 31 in reference frame F2. As will be explained in more detail later, not all of the data need necessarily be transformed. However, for ease of explanation, it will be assumed initially in this example that all such data is transformed. As shown in FIG. 5, the banknote sampling frame has its respective major axes aligned with the length and the width of the sampled banknote, with an origin O1 at a corner of the sampled banknote. The location of this position in the sampling frame F1 is determined by determining which of the data sample positions in the sampling frame corresponds to the origin O1. This can be done by determining which of the samples correspond to edge samples. It will be understood that samples from rows that occur before, after and on the transverse sides of the array will have values corresponding to full transmission, i.e. relatively high compared to the transmission of light through the banknote itself, thereby providing indication of the edge discontinuity. In this way, the controller 22 can determine the position O1 relative to the position O2 in the reference frame F2, which corresponds to the vector $\bar{r}$. This is indicated at step S2.1 in FIG. 7.

At step S2.2, the angle θ is determined by analysing the edge discontinuities of the array 31 shown in FIG. 5. It will be understood that the length m as compared with the width n is dependent upon the angle θ and that the relationship of m and n can be determined in terms of the number of pixels, thereby giving an indication of the angle θ between the sampling frame F1 and the reference frame F2.

Then, at step S2.3, individual data samples of the array 31 in the sampling frame are transformed into corresponding samples in the reference array 32 by means of a mapping function that utilises the values of $\bar{r}$ and θ determined at steps S2.1 and S2.2.

Figure 8:
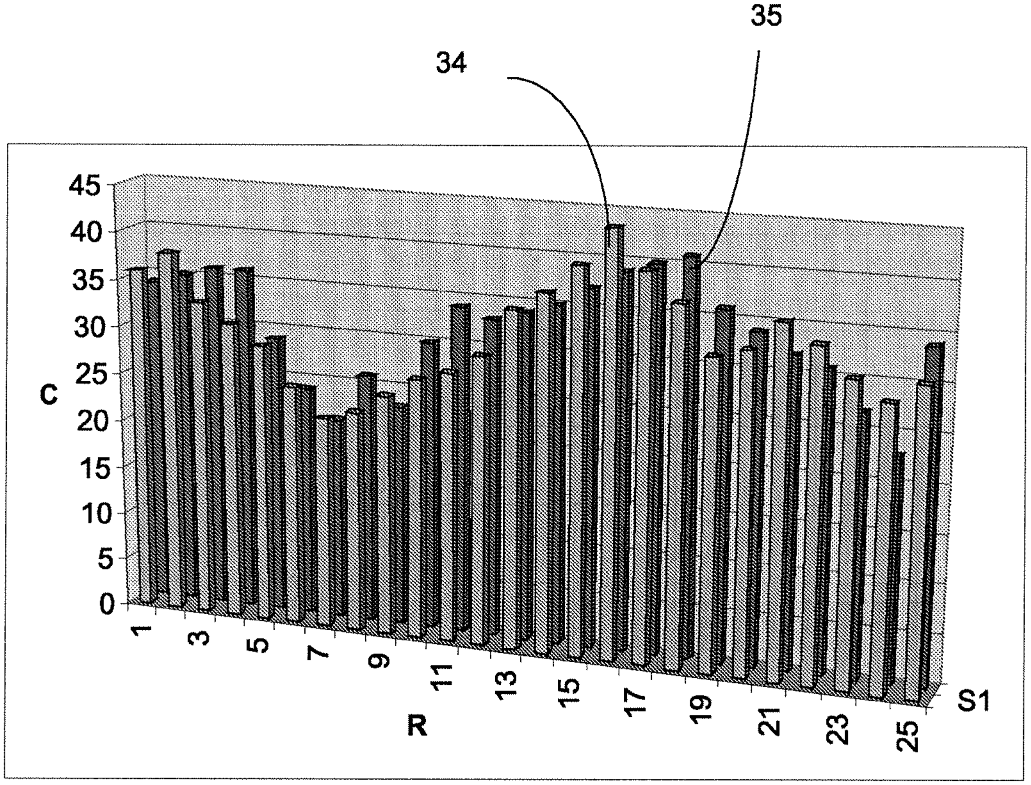
FIG. 8 is a graph illustrating transformed data in the reference frame to be compared with corresponding reference data for acceptable sheet objects.

Referring again to FIG. 5, the microprocessor memory 23 includes data corresponding to acceptable banknotes in the reference frame. In fact, data corresponding to only predetermined portions of the acceptable banknote may be stored in order to reduce the amount of data held in the memory 23. An example corresponds to a stripe 33 of data along the length of the banknote in the reference frame F2. A histogram of the data corresponding to the stripe 33 is illustrated in FIG. 8. Data 34 corresponds to reference data samples for an acceptable banknote and data 35 corresponds to the sample data transformed into the reference frame, along stripe 33 shown in FIG. 5, for the banknote under test. The comparison between the data 34 and 35 can be carried out by summing the squares of the differences between each successive sample and its reference value and determining whether the sum exceeds a predetermined threshold. Other ways of comparing the data will be evident to those skilled in the art. The banknote can be accepted or rejected on the basis of this comparison (step S4).

Many modifications and variations to the described device are possible. For example, it will be understood from reference to FIG. 5 that not all of the data in the sampling frame F1 need necessarily be transformed into the reference frame F2. In this example, only the data corresponding to stripe 33 needs to be transformed. Furthermore, the invention is not restricted to one particular stripe 33 and different areas of the transformed data may be tested against reference data. For example, a diagonal stripe or a rectangular area in one portion of the transformed data may be compared with reference data. Also, predetermined regions of the transformed data may be excluded from comparison with reference data. Furthermore, alternative ways of transforming the data from the sampling frame to the reference frame will be evident to those skilled in the art. For example, an iterative "best match" process may be performed in order to rotate the entire data array 31 until it best matches the array 32.

Alternative sensor arrangements are within the scope of the invention. For example, referring to FIG. 9, which corresponds to FIG. 1, the sensor arrangement comprises three semiconductor sensor arrays, which collectively traverse the width of the banknote path 3. Two of the arrays 36, 37 are arranged along the line A-A' whereas sensor 38 is disposed laterally from the line A-A'. This has the advantage that the pulley arrangement 14 can be disposed between the sensors 36, 37, with the sensor 38 ensuring that data is obtained from the entire width of the path 3.

Figure 9:
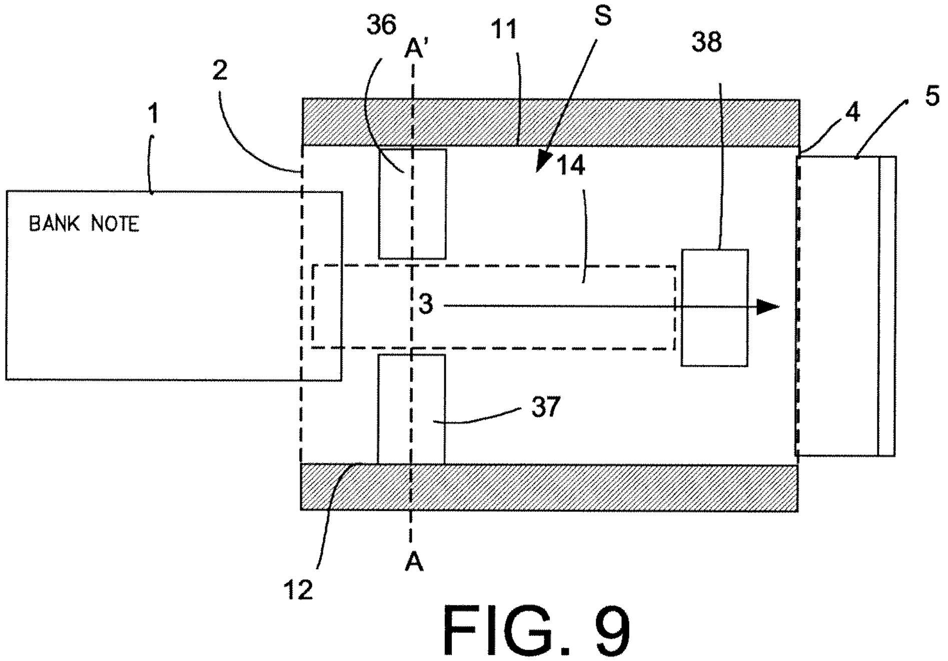
FIG. 9 is a schematic plan view of an alternative version of the device.
Figure 10:
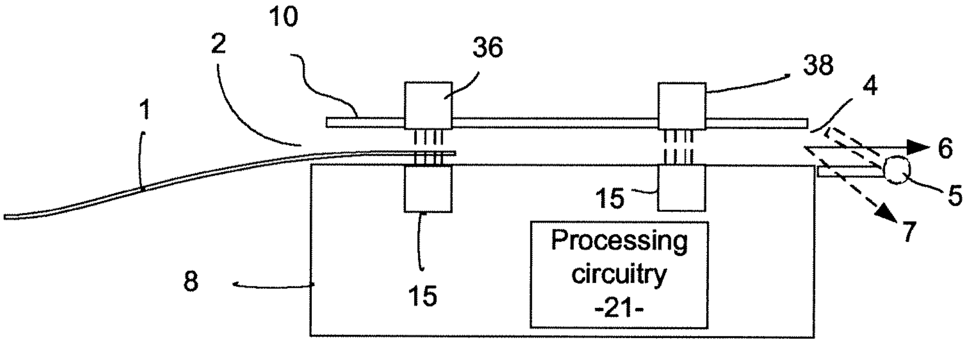
FIG. 10 is a sectional view of the device shown in FIG. 9.

The arrangement of FIG. 9 is shown in section in FIG. 10. Each of the sensor arrays 36-38 is provided with an individual light source 15.

Figure 11:
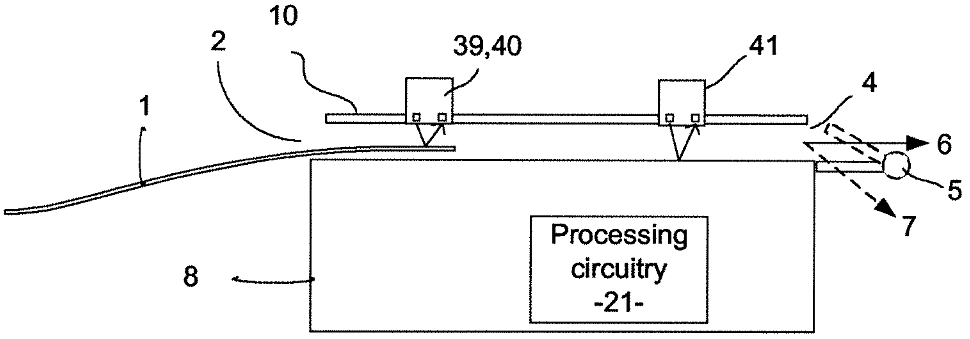
FIG. 11 is a sectional view of a further embodiment of a device according to the invention.

FIG. 11 illustrates an alternative arrangement, similar to that shown in FIG. 10, in which reflective sensors are used. Individual semiconductor chips 39, 40, 41 are configured on member 10, above the path 3, each of which includes both light emitters and corresponding detectors to detect light reflected back from the banknote 1.

In the forgoing example the mapping of the sample frame F1 to the reference frame F2 is performed with the origins O1, O2 for the frames being set at a corner of the data arrays in the two frames. As will be explained later, this can be done even in the event that the banknote is damaged and the corner corresponding to O1 is missing. Also, the origins for the frames can be placed at other locations in the arrays that correspond to one another e.g. at their centres.

Figure 12:
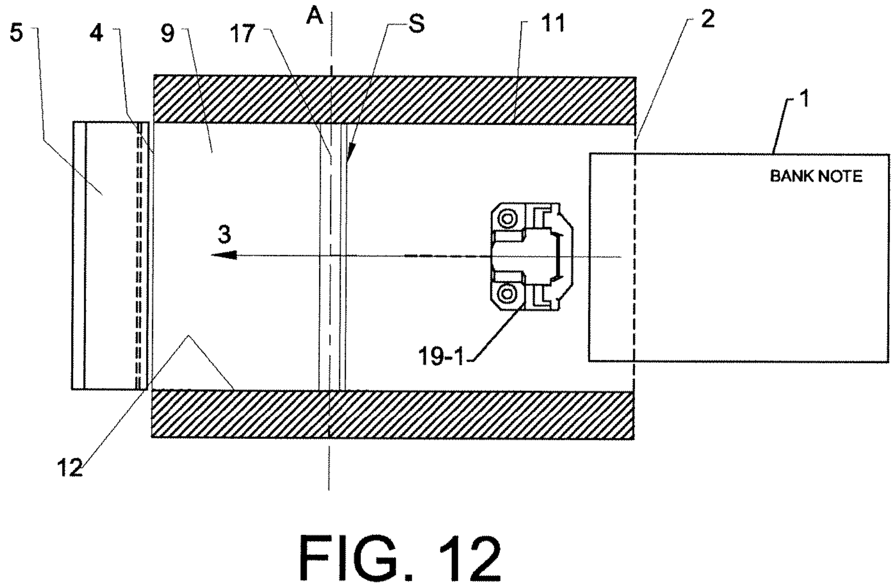
FIG. 12 is a schematic plan view of another acceptor device according to the invention.
Figure 13:
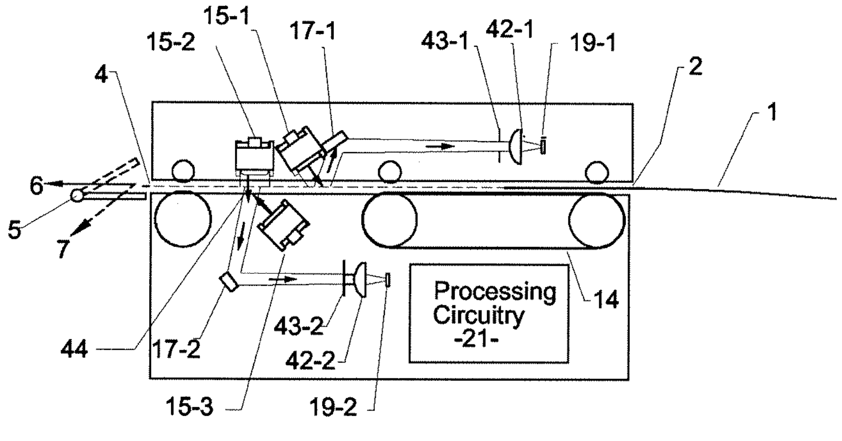
FIG. 13 is a schematic sectional view of the device shown in FIG. 12.

FIGS. 12 and 13 illustrate another embodiment of banknote acceptor according to the invention. The views of FIGS. 12 and 13 are generally similar to those of FIGS. 1 and 2 and like component parts are marked with the same reference numerals. In FIGS. 12 and 13, the banknote 1 travels from right to left through the sensing station S, in the direction of arrow 3.

As shown clearly in FIG. 13, the banknote under test can be illuminated in three different ways to test its reflective properties on each side and also its transmissive properties. To test reflection from the upper surface of the banknote, a light source 15-1 extends transversely across the platen 9 and directs optical radiation downwardly in a flat beam across the entire width of the platen 9. The optical radiation is reflected by the banknote 1 towards planar mirror 17-1, which directs the reflected radiation towards sensor 19-1. The sensor 19-1 in this example comprises a TAOS device with a row of 120 pixel CCD sensors. In use, only a portion of the row of pixels is used in order to accommodate variances in alignment that occur during manufacture, for example only a successive run 102 of the 120 pixels may be utilised for signal processing when detecting banknotes. The light source 15-1 comprises a light box containing an array of LEDs as described with reference to FIGS. 1 and 2, covered by a translucent, diffusing sheet.

A telecentric lens arrangement comprising converging lens 42-1 and associated stop 43-1 directs light from the mirror 17-1 onto the sensor 19-1. The telecentric lens arrangement is used instead of the fan shaped lens 18 shown in FIG. 1, and has the advantage of providing an image of fixed size regardless of any variation in distance of the banknote 1 from the lens 42-1 in the region of the sensing station S. The image focus quality will change slightly with variations in distance to the banknote, but the image will not change in size. The use of a small aperture for the stop 43-1 increases the depth of field and so make focus errors of less significance. The advantage of this lens system is that is despite movement of the banknote relative to imaging system and assembly errors in the building of the apparatus, the image size will always cover the same number of pixels on the CCD sensor array 19-1. This ensures that there are no practical errors in scanning if the banknote moves up or down during its passage through the sensing station S. Furthermore, changes in position due to wrinkled bills as compared to smooth ones, or from one acceptor to another, are also minimised. As a result, the acceptor can be constructed with wide tolerances in its optical system, which reduces the requirements for calibration of the device. The high light intensity of the light box 15-1 allows use of a small aperture for the stop 43-1 without increasing exposure times beyond efficient functional limits.

In order to test the transmission properties of the banknote, a second light source 15-2 extends across the width of the platen 9 and directs optical radiation downwardly through a transparent window 44 towards mirror 17-2 where it is reflected through a telecentric lens 42-2 with an associated stop 43-2, to a second CCD sensor array 19-2.

The reflective properties of the underside of the banknote are tested using a third optical source 15-3 that directs optical radiation into region of the window 44, to be reflected by the banknote towards mirror 17-2 and then to sensor 19-2 via mirror 17-2 and telecentric lens arrangement 42-2, 42-3.

The banknote thus can be analysed in terms of its optically reflective properties on both sides, and also in terms of its transmissive properties. Appropriate data can be gathered by selective use of the light sources 15-1, 2, 3, so as to provide sampling data to the processing circuitry 21. The banknote can be accepted or rejected in the manner described with reference to FIGS. 1 and 2, by using the gate 5 to direct acceptable banknotes along accept path 6 and rejected banknotes along reject path 7. Alternatively, the belt 14 can be driven in reverse to reject the banknote 1 through the inlet 2 after it has been fed in its entirety from the inlet 2 through the sensing station S.

When the banknote 1 is initially inserted into the inlet 2, the drive belt 14 progressively moves the banknote through the sensing station S so that successive rows of pixel data are developed by the sensors 42 over the entire surface region of the banknote in the manner previously described with reference to FIGS. 1 and 2. In this example, it is assumed that the rows of pixelated data are derived from the use of optical source 15-1 and associated CCD detector 19-1 although the ensuing description applies equally well to data developed at sensor 19-2 in response to optical radiation from light sources 15-2 or 15-3.

Figure 14:
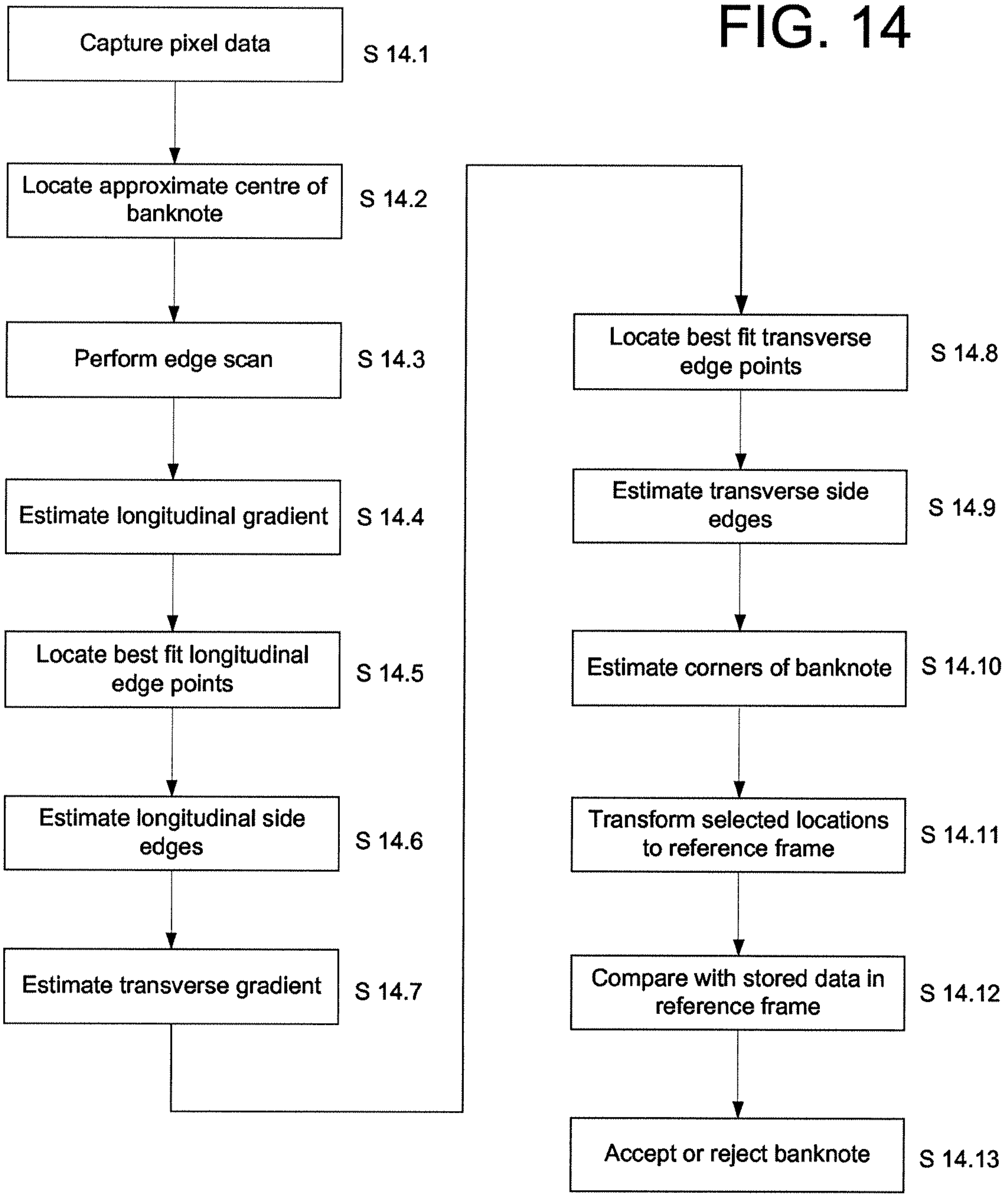
FIG. 14 is a schematic block diagram of an image data capture and de-skewing process for accepting or rejecting banknotes.
Figure 15A:
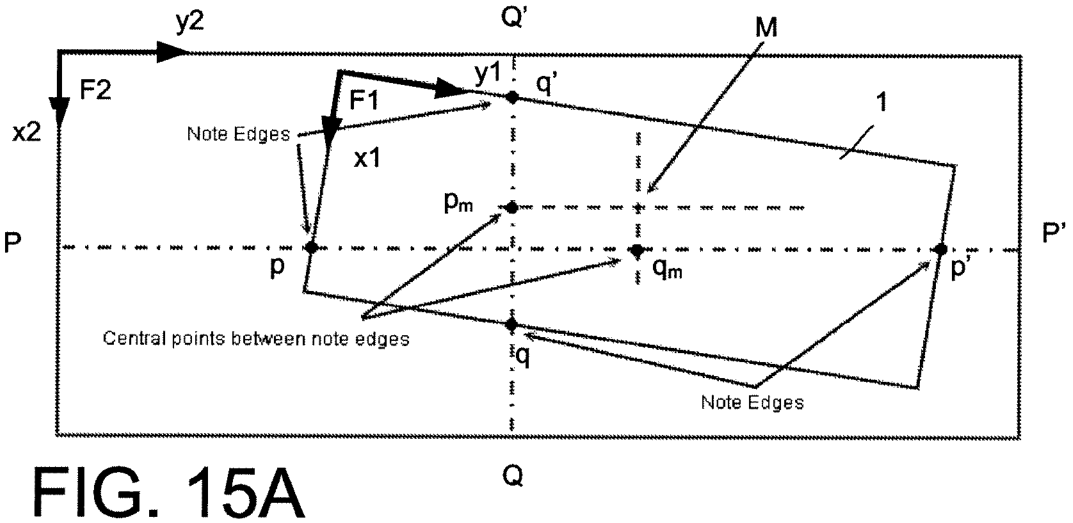
FIG. 15A-C are respective schematic views of a pixelated data array for explaining the de-skewing process described with reference to FIG. 14.

The de-skewing of the pixelated data from the banknote sampling frame F1 to the reference frame F2 will now be described with reference to FIGS. 14 and 15. FIG. 14 illustrates the process steps performed by a de-skewing algorithm run by the micro controller 22 shown in FIG. 3. It will be understood that when the banknote has passed completely through the sensing station S shown in FIG. 13, two-dimensional array of pixelated data is created, which is stored in memory 23 shown in FIG. 3. The capturing of the two-dimensional array of pixelated data is illustrated at step S14.1 in FIG. 14. FIG. 15A illustrates the resulting array of pixelated data schematically. The array is created in the reference frame F2. The outline of the banknote 1 as defined by the pixelated data is also shown, which defines the banknote sampling frame F1. The banknote sampling frame F1 is skewed relative to the reference frame F2 as previously described because the platen 9 is wider than the banknote 1, so that the banknote can enter within a range of angles. The reference frame F2 has an ordinate y2 and an abscissa x2. The perimeter of the banknote 1 is shown having a longitudinal dimension l and a transverse width dimension w. The edges of the banknote define the ordinate y1 and an abscissa x1 of the reference frame F1.

Optical radiation from source 15-1 reflected by the banknote 1 generally exceeds a predetermined threshold whereas optical radiation from regions of the platen 9 surrounding the banknote is not reflected significantly and therefore produces a lower signal value at the CCD sensor array 19-1 and so the edges of the banknotes can be determined by seeking step transitions in the values of the pixelated data corresponding to the banknote edges.

The de-skewing algorithm is configured to identify the edges of the banknote so as to define the banknote sampling frame F1 and then to transform selected data from the banknote into the reference frame F2 for comparison with stored data, so that authenticity of the banknote can be determined.

The scanning of the banknote at step 14.1 produces a large amount of data and the de-skewing algorithm is configured to allow efficient, rapid processing of the data so that reliable authentication of the banknote can be carried out on-the-fly.

In step 14.2, an approximate centre M of the banknote 1 is located. This is carried out by analysing the pixelated data derived at step S14.1 along horizontal and vertical centre lines of the array, along lines p-p' and q-q' shown in FIG. 15A. The pixelated data lying along these centre lines undergoes a sharp transition in value at the edges of the banknote 1 due to the change in reflection properties associated with the banknote 1 as compared with the remainder of the platen 9. The transitions associated with the banknote edges at positions p, p', q, q' are located in this way. The midpoint $p_m$ between p and p' is then computed, along with the midpoint $q_m$ between q and q'. This corresponds to the coordinates of a position M in the reference frame F2, where $M=(p_m, q_m)$.

The point M is an approximation of the midpoint of the banknote 1. Midpoint M does not need to be accurately located at the centre of the banknote 1. Its purpose is to provide an origin within the perimeter of the banknote from which series of scanning lines can be analysed in the pixelated data in order to define edge points around the parameter of the banknote 1 as will now be explained in more detail.

Figure 15B:
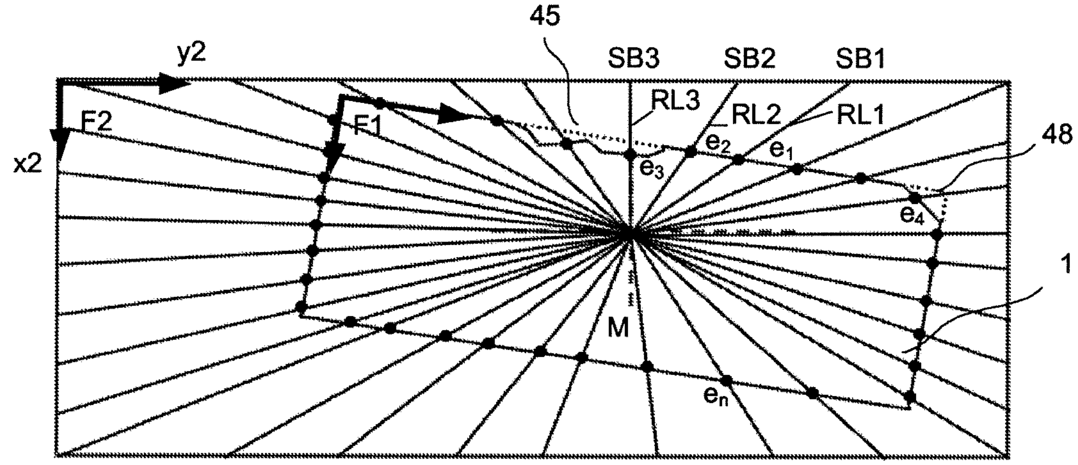
Figure 15C:
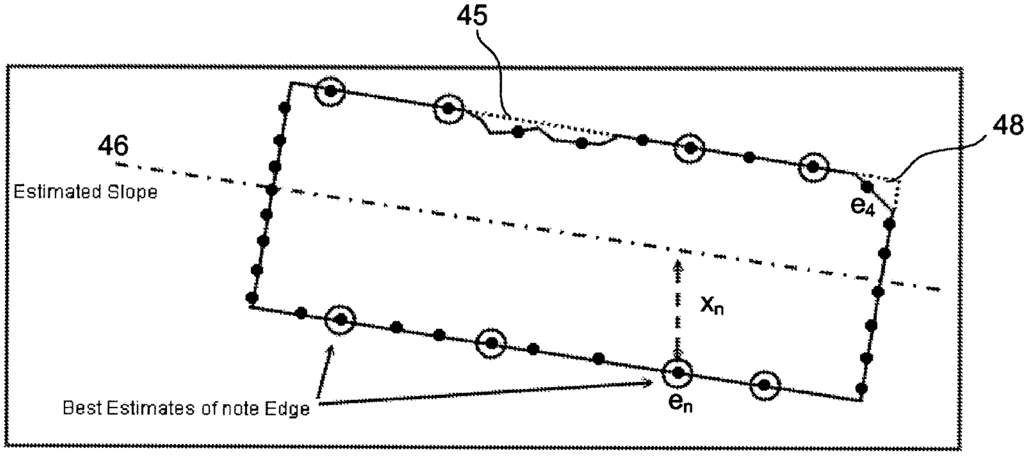

FIG. 15B illustrates the scanning lines as a sunburst of radially extending scanning lines RL1, RL2, RL3, that extend from the midpoint M of the banknote through the array of pixelated data. The scanning lines RL may be equally angularly spaced, but in order to provide computational simplicity, they may extend to predetermined coordinate positions around the perimeter of the array of the pixelated data e.g. to positions SB1, SB2, etc. When the pixelated data is scanned along each of the scanning lines, a sharp transition in value occurs at locations corresponding to the edge of the banknote 1, thereby enabling edge points to be detected. Scanning can be performed in either direction along the scanning lines RL.

As shown in FIG. 15B, an edge point e1 is located along scanning line RL1, edge point e2 is detected on scanning line RL2 and point e3 is detected along scanning line RL3, etc. It is to be noted that the banknote has a damaged edge in the region of point e3 and so the edge point e3 does not lie on the true straight edge of the banknote illustrated by dotted line 45. Similarly, the banknote is damaged in one corner so that detected edge point e4 does not lie on the true perimeter edge of the banknote.

The advantage of using the sunburst configuration of scanning lines RL is that the amount of data to be processed is reduced as compared with an analysis of all of the data in the rectangular pixelated array in reference frame F2. If all of the pixelated data were scanned for banknote edge transitions, much of the processing time would be spent scanning the area of the platen 9 surrounding the banknote, where no useful data is to be found, which is time consuming and would undesirably slow the process. Also, the scanning lines RL traverse the perimeter edges of the banknote 1 less obliquely than the rows x of the pixelated data produced by the CCD sensor array 19-1 in the reference frame F2, which improves the positional accuracy of the detected edge points e along the shorter, transverse edges of the banknote.

The number of scanning lines RL is selected depending on the processing power of the micro controller 22 and can be scaled according to its processing power.

Thus, a series of points $e_1$-$e_n$ are identified, each of which corresponds to the coordinates in reference frame F2 of edge positions of the banknote 1. A gradient associated with each of the edge points e is then determined, for example by considering the slope between each edge point e and its next adjacent point. The gradient associated with each of the edge points e falls into one of two populations. The edge points of the first population have a relatively low gradient associated with edge points along the longitudinal side edges l of the banknote 1. The edge points of the second population have a relatively high gradient associated with edge points along the transverse side edges w of the banknote 1. Because the entry angle of the banknote 1 relative to the platen 9 can only vary a limited amount from banknote to banknote e.g. 15 degrees, the relationship of the population distributions always holds true, although the actual values of the gradients for the populations will vary depending on the entry angle.

The mode value or some other average of the gradients associated with the points of the first population is then computed at step S14.4. This mode value is an estimation of the slope of the longitudinal side edges of the banknote 1 in the reference frame F2. The processor 23 then simulates an arbitrary line corresponding to the slope illustrated by patch line 46 in FIG. 15C. A distance $y_n$ of the points $e_{10}$ from the line 46 is then computed for points within the first population. The points having the greatest value of $y_n$ are selected as best estimates of the banknote edge, the points being circled in FIG. 15C. In this way, points which lie on the damaged edge e.g. in region 45, can be rejected. Then, straight lines of the form y=mx+c can be fitted to the best estimates of the longitudinal note edges at step S14.6. It will be understood that the best fit lines of the form y=mx+c for the longitudinal edges are defined in the reference frame F2.

Figure 15D:
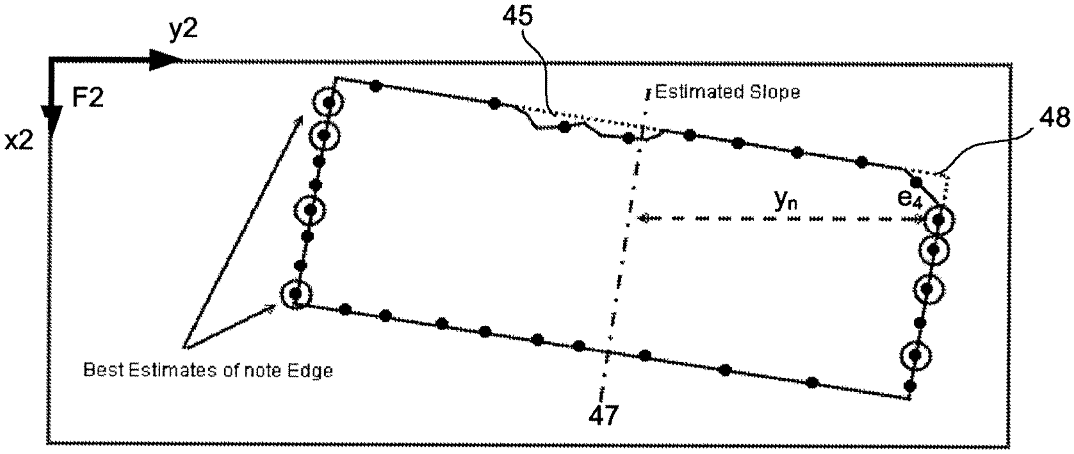

The process is then repeated at steps S14.7-S14.9 in respect of the second population of edge points which relate to the transverse edges w of the banknote 1. The best fit transverse edge points are created at step S14.8 as illustrated in FIG. 15D, by selecting edge points of maximal distance $x_m$ from the estimated slope indicated by hatched line 47.

Figure 15E:
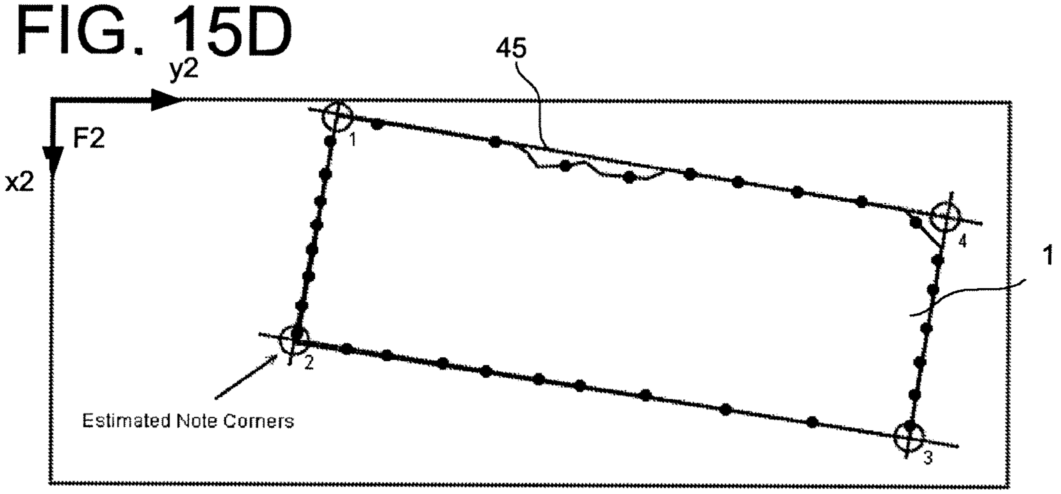

Then, at step S14.10 the corners of the banknote are estimated by calculating the points of intersection of the best fit lines that describe the four side edges of the banknote 1, as illustrated in FIG. 15E. Thus, the coordinates of the four corner points are calculated in reference frame F2. As shown in the top right hand corner of the banknote 1, the effect of a damaged corner does not confuse or degrade the positional data in regard to the banknote 1.

Figure 15F:
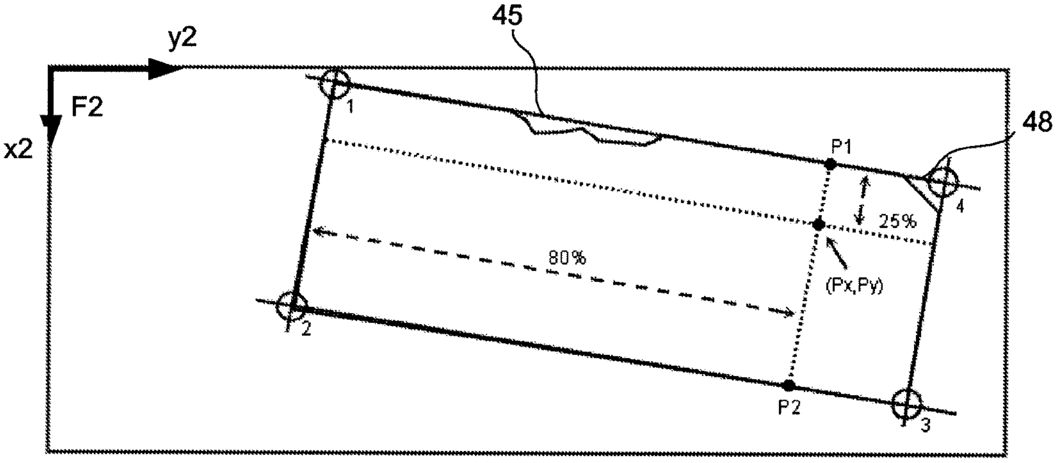

Thus, the position of the banknote 1 is now defined in the reference frame F2. At step S14.11, the pixel data for selected locations in the banknote are transformed into the reference frame. For example, if it is desired to look at location which is 25% down from the upper edge of the banknote and 80% along its length, as shown in FIG. 15F, this position can be calculated in reference frame F2 from the knowledge of the corners and side edges of the sampled banknote in the reference frame F2. Pixels in the selected positions on the banknote can then be compared at step S14.12 with corresponding reference data stored in the memory 23 of FIG. 3 by micro controller 22. The banknote can then be accepted or rejected on the basis of the comparison carried out at step S14.13.

Figure 16:
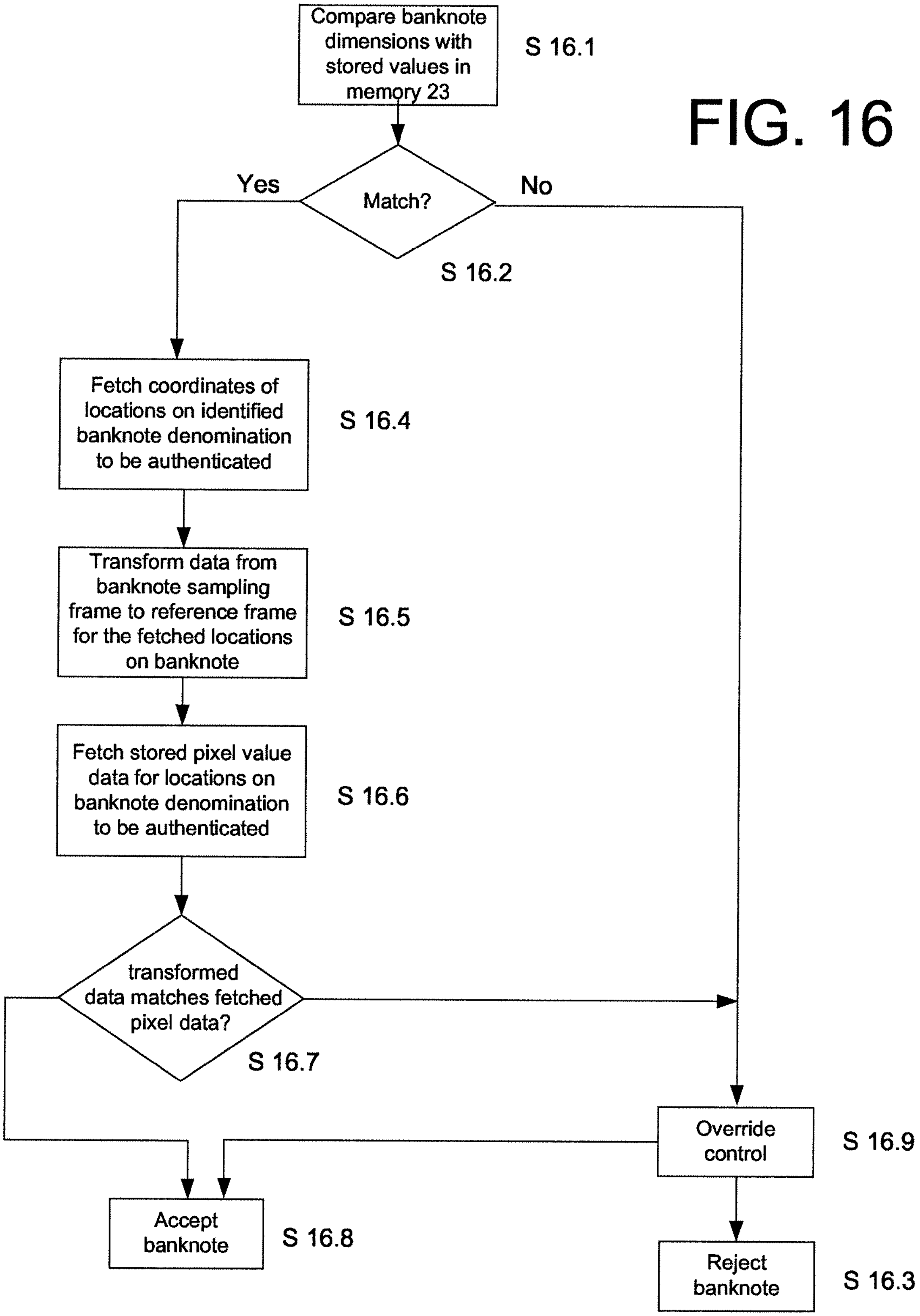
FIG. 16 is a more detailed flow diagram of the de-skewing and authentication process described with reference to FIG. 15.

The transformation, comparison and acceptance steps S14.11-S14.13 will now be described in more detail with reference to FIG. 16. Having estimated the locations of the corners of the banknote 1 at step S14.10, the dimensions of the banknote can be determined. Then, referring to FIG. 16, the dimensions of the detected banknote are compared with stored values of dimensions of acceptable banknotes held in memory 23. The stored values may comprise a window ranges of length and width dimensions associated with each individual denomination of banknote that can be accepted by the banknote acceptor. The window of ranges allows for small manufacturing tolerances in the acceptor and banknotes to be tolerated. This comparison is carried out at step S16.1 in FIG. 16 to provide an initial indication of the denomination of the banknote. If no match is found at step S16.2, the banknote is rejected at step S16.3. However, if a match is found, stored data corresponding to pre-selected locations on the banknote for the particular denomination of the banknote are fetched from memory 23, based on the denomination signified by the detected dimensions of the banknote. It has been found that for individual banknote denominations, there are regions of the banknote which are particularly distinctive and provide good characterisation of the banknote denomination, which obviates the need to check all of the pixel data from the entire surface area of the banknote that simplifies and speeds up the data processing. Location data corresponding to these regions are stored in the memory 23 in association with data corresponding to the dimensions of the banknote for respective individual denominations.

Then, at step S16.5, the pixel data for the banknote 1 captured during step S14.1 is transformed selectively into the reference frame F2, for the locations on the banknote that were fetched from the memory for the particular denomination, at step S16.4.

The transformed pixel data from the selected locations of the banknote is then compared with corresponding stored values for the particular denomination fetched from memory 23. The pixel values correspond to the intensity of reflected light from particular pixel areas of the banknote e.g. on a 1-256 greyscale. The pixels may in fact comprise groups of pixels. The data held in memory 23 may comprise data ranges or windows, within which the detected pixel values must fall in order to signify an acceptable banknote. The acceptability is tested at step S16.7 and if the transformed data from the banknote 1 matches the pixel data fetched from memory 23, the banknote is accepted at step S16.8 but otherwise rejected at step S16.3. The acceptability can be determined by mean squared summing method described with reference to FIG. 8.

In a modification, a user operable override at step S16.9 may be provided so allow the user to override rejection of the banknote and allow it to be accepted. This can be useful at a point of sale device where a till operator manually inspects a worn banknote, which is not accepted by the device but nevertheless is acceptable to the operator. The override is only available to authorised personnel and can be useful to allow the operator to prevent a hold up in a checkout queue, where a customer offers a worn banknote and has no other convenient means of paying.

The selected regions of the banknote used to authenticate a particular denomination can be determined by trial and experiment so that particular regions which are difficult for a fraudster to replicate can be used for discrimination purposes. The areas selected can be programmed into the banknote acceptor using a programming tool illustrated in FIG. 3. The programming tool comprises a processor and display screen, which comprises a laptop computer 49 in this example, although other similar devices can be used such as a workstation or a portable, bespoke programming tool for use in the field. The laptop computer is temporarily connected to micro controller 22 through lead 50 or through a wireless connection.

Figure 17:
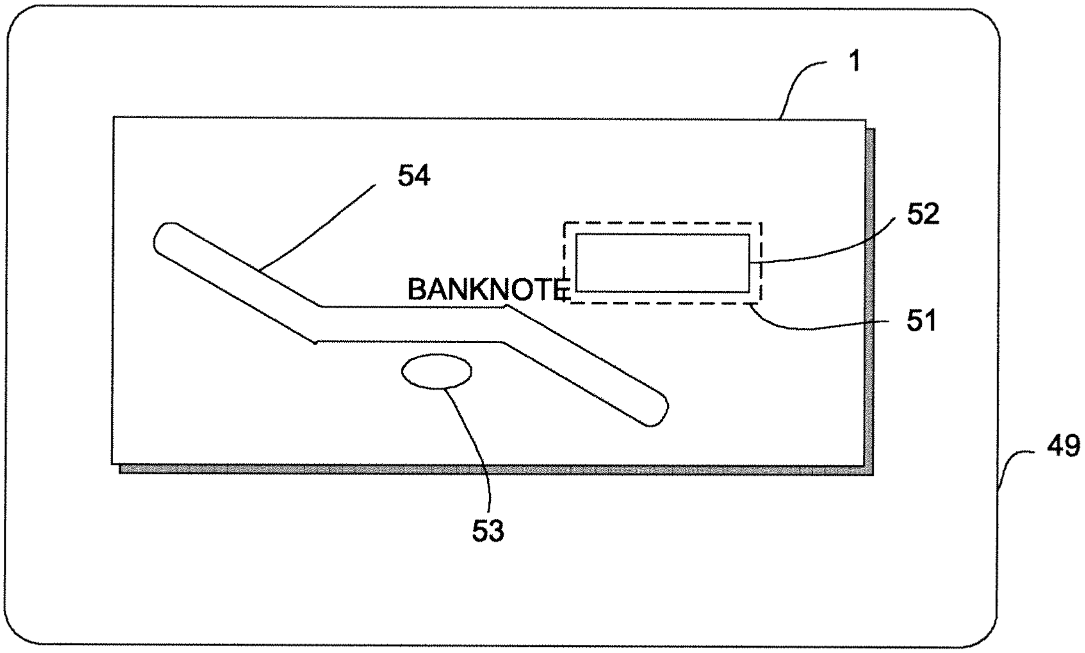
FIG. 17 is a schematic illustration of a display provided by a programming tool for the banknote acceptor.
Figure 18:
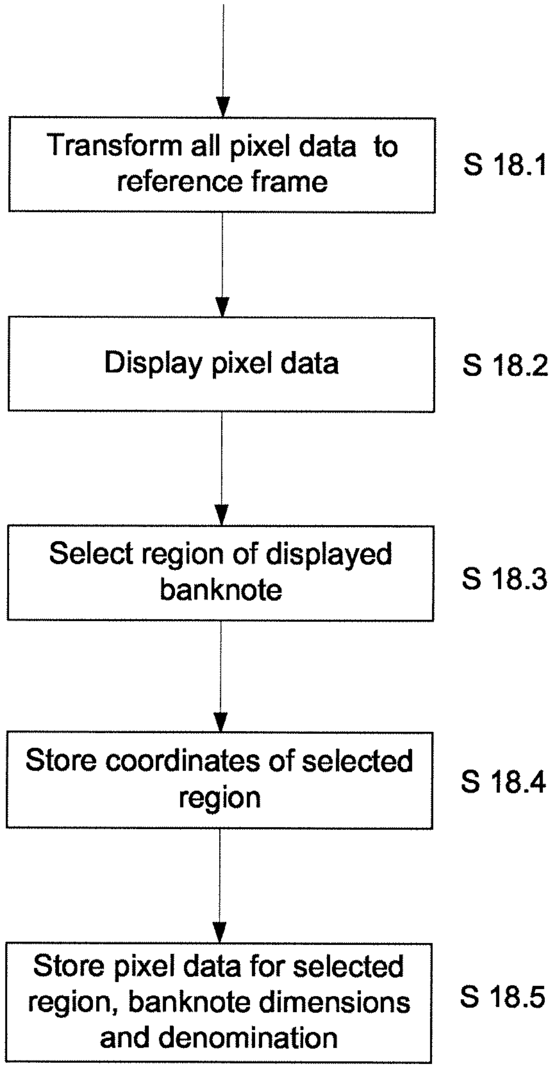
FIG. 18 is a block diagram of a process for programming the banknote acceptor using the programming tool.

In order to program the selected areas, an acceptable banknote for a particular denomination is fed into inlet 2 of the banknote acceptor. Pixelated data corresponding to the banknote is captured as previously described with reference to FIG. 14 and then de-skewed using the de-skewing algorithm previously described. Thus, steps S14.1-14.10 are performed as previously described. Then, instead of transforming selected locations of the banknote, all of the pixelated data for the banknote is transformed into the reference frame F2 as shown at step S18.1 of FIG. 18. The resulting data is then displayed on the screen of the computer 49 shown in FIG. 3, to provide a display as illustrated in FIG. 17. Then, using the mouse or other control device of the computer, a selection region is 51 illustrated in dotted outline is maneuvered to be coextensive with a selected region of the banknote as displayed on computer 49.

Then, at step S18.3, the coordinates of the selected region are stored. Additionally, the pixel data within the selected region 52 is stored along with the dimensions of the banknote and data corresponding to its denomination. In this way, the data used in the authentication process described in FIG. 16 can be stored in the memory and also adapted over time to take account of different authentication experiences so that enhanced location selection can be carried out to improve the authentication process. For example, different regions 53, 54 shown in FIG. 17 may be added or substituted for selection region 52 for a banknote of a particular denomination. The regions can be of different selectable shapes and sizes. For example the selected region 53 is a generally circular region of the pixelated data, whereas the region 54 is of a slalom configuration, extending between regions of interest disposed at different locations on the banknote 1. The regions 52, 53 and 54 are each wholly within and spaced from the perimeter of the banknote 1. Also, the stripes 33 described with reference to FIG. 5 can be used either in combination with or instead of the regions 52-54.

Banknote acceptors according to the invention need not be programmed and updated individually. Instead, the selection process shown in FIGS. 17 and 18 can be carried out centrally and the resulting data downloaded to a group of individual acceptors, for example through a network or by means of a plug-in flash memory or other suitable techniques open to those skilled in the art.

The described embodiments of the invention have the advantage that no mechanical arrangement is needed to align the incoming banknote with a particular orientation relative to the sensing station S. Also, the device can accept and reject banknotes of different sizes. To this end, the processing of the data samples may include making an estimation of the length and width of the sampled data array in order to select which of the reference data from the memory 23 is to be compared with the transformed data array, so as only to select data corresponding to candidate denominations of banknote corresponding to the dimensions of the sampled data array.

Whilst examples of the invention have been described in relation to banknotes, the invention can also be used with other sheet objects such as tokens and sheets which do not necessarily have an attributable monetary value. For example, the device may be operable to accept or reject sheet objects prepared by general printing or machine readable characters such as barcodes. Other examples of sheet objects are bank cheques, coupons and tokens that may be coded with a barcode.

Different types of light sources can be used for the or each source 15. Rather than using optical radiation from a broadband source, one or more narrow bands can be used, either by filtering the broadband source or by providing individual sources that emit a respective narrow band, which may themselves be filtered with external filters. The term "optical radiation" as used herein includes visible and non-visible radiation such as ultraviolet and infra-red. The filtering may be performed in the vicinity of the or each light source, the sensor array or elsewhere. Also, different sensor arrangements can be used for the sensing station S. For example, an optical fibre array may be used either in transmission or for reflection both to guide optical radiation to the sensing station and also to derive the data samples.

Furthermore, the pixelated arrays may include sub-pixels to allow different wavelength ranges to be processed individually, so that an analysis can be performed for the data samples e.g. in primary colours.

The invention claimed is:

1. An acceptor device for sheet objects, comprising:

a sensor to derive data corresponding to a spatial array of sample data from a face of a sheet object, said sample data being configured in a sampling frame that lies within a range of positional relationships to a reference frame;

a processor configured to process the data to:

identify an approximate mid location within the perimeter of the sheet object, define scanning lines extending outwardly from said approximate mid location and traversing locations corresponding to edges of the sheet object, scan data samples along the scanning lines to identify locations corresponding to edges of the sheet object, and determine the relationship between the reference frame and the sampling frame for the sensed data based on the identified locations of the sheet object, the processor being operable to transform pre-selected regions of the sensed data from the sampling frame so as to correspond to data in the reference frame, and to make a comparison of the transformed data with reference data corresponding to the pre-selected regions in the reference frame that define acceptability criteria for sheet objects in said reference frame; and an acceptor responsive to the processor and operable to accept or reject the sheet object depending on the outcome of the comparison.

2. A device according to claim 1 wherein the sensor comprises an array of detectors configured to sample a plurality of rows of data samples from the sheet object.

3. A device according to claim 2 including an inlet for a sheet object, a path extending from the inlet through a sensing station whereat the sensor is operable to sample a plurality of rows of samples of data from the sheet object as it passes through the sensing station.

4. A device according to claim 1 wherein the processor is configured to identify a predetermined location in the array of the sample data in the sampling frame relative to a corresponding location in the reference frame.

5. A device according to claim 4 operable to accept sheet objects with a generally symmetrical quadrilateral periphery, and wherein said identified location corresponds to a corner of the sheet object.

6. A device according to claim 1 wherein the processor is configured to identify the orientation of the array of the sampled data in the sampling frame relative to the reference frame.

7. A device according to claim 6 wherein the orientation is identified by an analysis of edge regions of the array of data samples.

8. A device according to claim 4 wherein the processor is configured to transform the sample data into the reference frame using said identified location and/or said identified orientation.

9. A device according to claim 1 wherein the sensor is an optical sensor.

10. A device according to claim 9 including a source to transmit optical radiation through the sheet object to the sensor.

11. A device according to claim 9 including a source to transmit optical radiation to be reflected from the sheet object to the sensor.

12. A device according to claim 9 including a telecentric lens arrangement for directing the optical radiation from the sheet object to the sensor.

13. A device according to claim 1 wherein the sensor comprises a spatial array of sensor elements.

14. A device according to claim 13 wherein said sample data is derived from only some of the sensor elements in the array.

15. A device according to claim 1 wherein the processor is configured to:

make an initial determination of a particular denomination for the sensed sheet object, and based on the outcome of said initial determination, obtain stored information in the reference frame corresponding to pre-selected locations on the sheet object of said particular denomination and stored reference data values for the pre-selected locations, transform sensed data for the sheet object from the sample frame to reference frame for the pre-selected locations, and to compare the transformed data with the stored reference data values to determine authenticity of the sensed sheet object.

16. A device according to claim 1 wherein said mid location corresponds to a mid point of the array of data samples in said reference frame.

17. A device according to claim 1, wherein the processor is configured to provide data corresponding to the gradient of the edge of the sheet object for the edge points.

18. A device according to claim 17 wherein the processor is configured to group the identified edge points so as to correspond to particular edges of the sheet object based on said gradient data.

19. A device according to claim 1 wherein the processor is configured to fit edge lines through the edge points to define the edges of the sampled sheet object.

20. A device according to claim 19 wherein the processor is configured to compute where said edge lines intersect so as to identify the locations of corners of the object in the reference frame.

21. A device according to claim 1 including an override control for selectively causing the acceptor to accept the sheet object irrespective of the outcome of the comparison.

22. A non-transitory computer readable medium containing a program for accepting sheet objects, the program being configured to:

receive data corresponding to a spatial array of data samples from a face of a sheet object, said data being configured in a sampling frame that lies within a range of positional relationships to a reference frame;

process the sample data to identify an approximate mid location within the perimeter of the sheet object, to identify scanning lines extending outwardly from said approximate mid location and traversing locations corresponding to edges of the sheet object, to determine the relationship between the reference frame and the sampling frame for the sensed data based on the identified locations of the sheet object, to transform pre-selected regions of the sensed data from the sampling frame so as to correspond to data in the reference frame, and to make a comparison of the transformed data with reference data corresponding to the pre-selected regions in the reference frame that define acceptability criteria for sheet objects in said reference frame; and generate a result depending on the outcome of the comparison.

23. A method of accepting sheet objects, comprising:

deriving data corresponding to a spatial array of data samples from a face of a sheet object, said array being configured in a sampling frame that lies within a range of positional relationships to a reference frame;

processing the data to identify an approximate mid location within the perimeter of the sheet object, to identify scanning lines extending outwardly from said approximate mid location and traversing locations corresponding to edges of the sheet object, to determine the relationship between the sampling frame for the sensed data array and the reference frame based on the identified locations of the sheet object, to transform at least pre-selected locations in the sensed data from the sampling frame so as to correspond to data in the reference frame, and to make a comparison of the transformed data with reference data corresponding to acceptability criteria for pre-selected locations of the sheet object said reference frame; and accepting or rejecting the sheet object depending on the outcome of the comparison.

24. A method according to claim 23 including deriving said sampled data without pre-positioning the sheet object against a mechanical guide.

* * * * *